March 20, 1945.  J. BOYD  2,372,054
BEARING ASSEMBLY
Filed Sept. 15, 1943
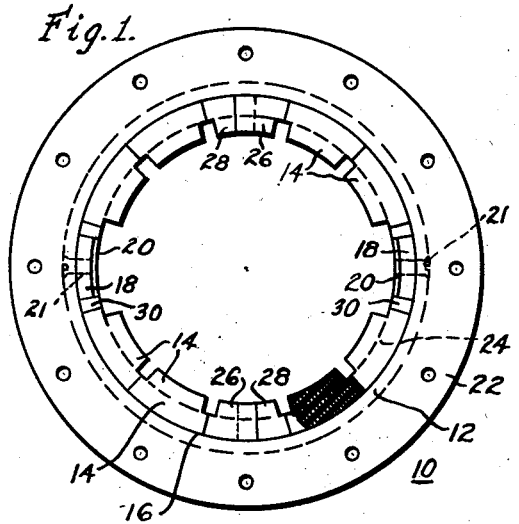
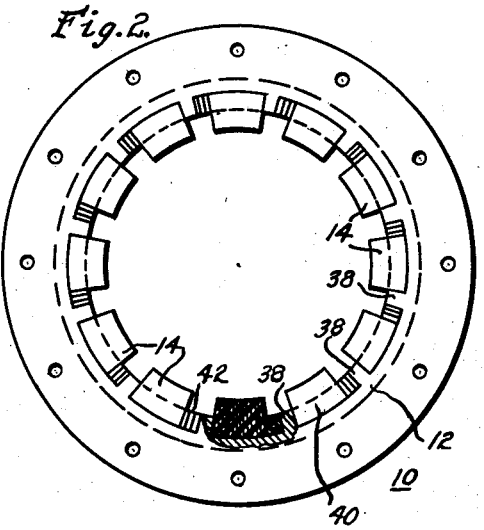
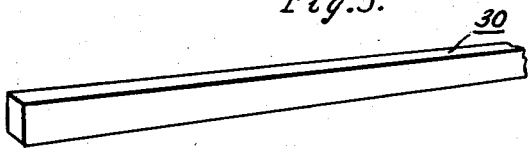
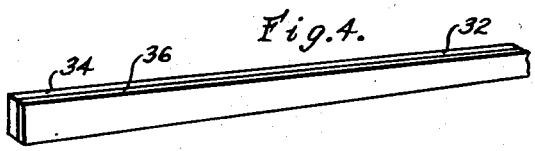
WITNESSES:
INVENTOR
John Boyd.
BY
ATTORNEY Patented Mar. 20, 1945

2,372,054

UNITED STATES PATENT OFFICE 2,372,054

BEARING ASSEMBLY

John Boyd, Forest Hills, Pa., assignor to Westinghouse Electric & Manufacturing Company, East Pittsburgh, Pa., a corporation of Pennsylvania Application September 15, 1943, Serial No. 502,499

8 Claims. (Cl. 308—238)

This invention relates to bearings and, in particular, to composition bearings.

Heretofore bearings of fibrous material impregnated with heat-hardening resinoid have been utilized quite generally in the steel industry. Recently such composition bearing material has been employed in marine bearings, the composition material being formed in staves and mounted in a housing.

It has been found that the staves of such marine bearings swell and become distorted in service, the swelling being to such a degree that the staves often seize the shaft that runs in the bearing.

An object of this invention is to provide for compensating for the swelling of a composition bearing.

Other objects of this invention will become apparent from the following description when taken in conjunction with the accompanying drawing, in which:

Figure 1 is a view in elevation and partly in section of a bearing assembly embodying the teachings of this invention;

Fig. 2 is a view in elevation and partly in section of another bearing assembly embodying the teachings of this invention;

Fig. 3 is a view in perspective of a wedge employed in the assembly of Fig. 1;

Fig. 4 is a view in perspective of another wedge which may be employed in the assemblies of Figs. 1 and 2; and Fig. 5 is a view in perspective of the laminated wedge utilized in the assembly of Fig. 2.

Referring to Fig. 1, this invention is illustrated by reference to a bearing assembly 10 comprising a housing 12 of metal or other suitable material and a plurality of bearing staves 14 disposed to seat on the bore 16 of a housing between keeper strips 18 and 20. The keeper strips 18 and 20 may be of any suitable material such as metal or laminated fibrous material impregnated with a heat-hardening resinous binder. The keeper strips 18 and 20 are preferably disposed diametrically opposite one another and extend through the assembly for the length of the housing being secured to the housing by the screws 21. End flanges 22 and 24 are carried by the housing to facilitate the mounting and maintenance of the staves and keeper strips therein and to aid in mounting the assembly.

The staves 14 in the embodiment illustrated in Fig. 1 are preferably divided into two groups disposed to seat on opposite sides of the keeper strips 18 and 20. Each of the staves 14 and in some cases the keeper strips 18 and 20 are formed of laminated fibrous material such as duck, or other cloth fabrics impregnated with a resinous binder, such as phenolic, urea, vinyl, or other resin or resinous mixtures consolidated under heat and pressure into a strong body. Such materials are well known in the art and need not be further described herein, it being apparent that the choice of the fibrous material and resinous binder used therewith depends upon the characteristics which it is required to develop in the bearing material. Preferably the staves 14 are so designed and machined to shape that the laminations of the fibrous material extend substantially perpendicular to the base of the stave to present edges at the bearing surface, as illustrated in Fig. 1.

In assembling the staves 14 to seat on the bore 16 of the housing, the staves are disposed in edge-to-edge contact with adjacent staves, one of the staves 14 in each of the two groups being formed of two wedge-shaped segments 26 and 28, as illustrated, to facilitate mounting of the staves.

In the embodiment illustrated in Fig. 1, a resilient member 30 is disposed at each of the ends of each of the groups of staves between the keeper strip and the edge of the adjacent stave. The resilient member 30 has a length equivalent to the length of the staves 14 and is preferably formed of an oil resistant elastomer, such as synthetic rubber. The elastomers, polychlorobutadiene, known to the trade as Neoprene, and polyisobutylene, or the modified isobutylene synthetic rubbers, have proven to be satisfactory. Another elastomer which has been found to be suitable for this purpose is that known to the trade as butyl rubber compound No. 1612. These synthetic rubbers have an extremely long life and exceptional resiliency rendering them suitable for use in the bearing assembly of this invention.

With the resilient members 30 disposed in position between the keeper strips and the adjacent staves 14, the staves 14 can readily be tightly positioned between the keeper strips 18 and 20 by means of the stave formed of the wedge-shaped components 26 and 28. In wedging the staves 14 in position, the resilient members 30 are somewhat compressed but retain sufficient resiliency that when the staves 14 swell in service under the influence of a liquid, the resilient members 30 become further compressed to compensate for the swelling of the staves 14. The compressing of the resilient members 30 thereby prevents a distortion of the staves 14 to distort the internal bearing surface pattern of the bearing assembly and thereby maintains a substantially uniform bearing surface for the assembly.

Instead of the resilient member 30 illustrated in Figs. 2 and 3, the resilient member 32 of Fig. 4 may be employed. The resilient member 32 is formed of a plurality of laminations 34 and 36, the lamination 34 preferably being formed of the elastomer material described hereinbefore whereas the lamination 36 is preferably formed of fibrous material impregnated with a resinous binder. The laminations 34 and 36 are secured together to form the member 32 by any of the well known methods, the combined resilient member 32 facilitating the handling and placing of the resilient material in position between the keeper strips and the adjacent staves.

In another embodiment of this invention illustrated in Fig. 2, the bearing assembly 10 comprises the housing 12, the internal bore of which is formed with a plurality of longitudinally extending stops 38 which are radially spaced from one another to provide a plurality of recesses 40 about the bore of the housing. As in the previous embodiment, the staves 14 are formed of laminated fibrous material impregnated with heat-hardening resinold, the staves 14 being disposed in the recesses 40 with the laminations of the staves extending substantially perpendicular to the base of the stave to present edges at the bearing surface.

In this embodiment the recesses 40 between the stops 38 have sufficient width to accommodate a stave 14 and a resilient member 42. The resilient member 42 is preferably disposed between an edge of the stave 14 and one of the stops 38 to tightly wedge the stave 14 against the other associated stop 38 forming the recess.

The resilient member 42 utilized in this embodiment is preferably formed of a plurality of laminations 44, 46, and 48, as better illustrated in Fig. 5, the internal lamination 46 being formed of the oil resistant elastomer, while the facing laminations 44 and 48 are formed of fibrous material impregnated with the resinous binder. As in the case of the resilient material 32 described hereinbefore, the laminations 44, 46, and 48 are preferably secured together to form an integral resilient member 42 which can be readily handled. By facing the lamination 46 formed from the elastomer with the laminations 44 and 48 formed of fibrous material impregnated with the resinous binder, it is found that the mounting of the stave 14 in the recess 40 is more readily accomplished, for the hard smooth facing laminations 44 and 48 permit the driving the resilient member 42 into position between the edge of the stave 14 and the stop 38 to be more readily accomplished.

In wedging the resilient member 42 in position between the stave 14 and the stop 38, the elastomer lamination 46 sandwiched between the hard facing sheets 44 and 48 of the member 42 is compressed, the elastomer component of the member 42, however, having sufficient resiliency to effectively compensate for the swelling of the stave 14 when the stave 14 becomes swollen under the influence of a lubricating medium utilized with the bearing assembly.

By employing the resilient members in the bearing assemblies, as described hereinbefore, it is found that it is possible to provide a composition bearing assembly which will have a substantially uniform bearing surface even though subjected to immersion in liquids, the bearing assemblies thereby having an extremely long life. Further, the resilient member facilitates the assembly of the bearing assemblies since it is not necessary to so accurately machine the individual staves as the resilient material employed in the resilient members compensates for such slight inaccuracies as well as for the swelling of the staves when subjected to liquids.

Although this invention has been described with reference to particular embodiments thereof, it is, of course, not to be limited thereto except in so far as is necessitated by the scope of the appended claims.

I claim as my invention:

1. In a bearing, in combination, a housing, a plurality of staves disposed to seat on the housing to provide a bearing surface, each of the staves comprising a strong body consolidated from laminated fibrous material impregnated with heat-hardening resinold, a stop associated with at least one of the staves, and a resilient member comprising an oil resistant elastomer disposed between the stave and the stop to compensate for swelling of the stave under predetermined conditions.

2. In a bearing, in combination, a housing, a keeper strip carried by the housing, a plurality of staves disposed in edge-to-edge relation to seat on the housing on opposite sides of the keeper strip, each of the staves comprising a strong body consolidated from laminated fibrous material impregnated with heat-hardening resinold, and a resilient member comprising an oil resistant elastomer disposed between the staves and the keeper strip to compensate for swelling of the staves under predetermined conditions.

3. In a bearing, in combination, a housing, a pair of keeper strips disposed diametrically opposite one another carried by the housing, a plurality of staves disposed in edge-to-edge relation between the keeper strips to seat on the housing and provide a bearing surface, each of the staves comprising a strong body consolidated from laminated fibrous material impregnated with heat-hardening resinold, and a resilient member comprising an oil resistant elastometer disposed between each of the keeper strips and an adjacent stave to compensate for swelling of the staves between the strips under predetermined conditions.

4. In a bearing, in combination, a housing, a plurality of longitudinally extending spaced stops carried by the housing, a stave disposed to seat on the housing between adjacent stops, the stave comprising a strong body consolidated from laminated fibrous material impregnated with heat-hardening resinold, and a resilient member comprising an oil resistant elastomer disposed between the stave and one of the stops associated therewith to compensate for swelling of the stave under predetermined conditions.

5. In a bearing, in combination, a housing, a plurality of longitudinally extending spaced stops carried by the housing, a stave disposed to seat on the housing between adjacent stops, the stave comprising a strong body consolidated from laminated fibrous material impregnated with heat-hardening resinold, and a resilient wedge disposed between the stave and one of the stops associated therewith, the wedge comprising a laminated body having one of the laminations formed of an oil resistant elastomer, the wedge holding the stave tightly in position between adjacent stops and effectively compensating for swelling of the stave under predetermined conditions.

6. In a bearing, in combination, a housing, a plurality of staves disposed to seat on the housing to provide a bearing surface, each of the staves comprising a strong body consolidated from laminated fibrous material impregnated with heat-hardening resinoid, a stop carried by the housing associated with at least one of the staves, and a resilient wedge composed of an oil resistant elastomer disposed in tight fitting relation between the stave and the stop to compensate for swelling of the stave under predetermined conditions.

7. In a bearing, in combination, a housing, a plurality of staves disposed to seat on the housing to provide a bearing surface, each of the staves comprising a strong body consolidated from laminated fibrous material impregnated with heat-hardening resinoid, a stop carried by the housing associated with at least one of the staves, and a resilient wedge disposed in tight fitting relation between the stave and the stop to compensate for swelling of the stave under predetermined conditions, the wedge comprising a laminated body having one of the laminations formed of an oil resistant elastomer.

8. In a bearing, in combination, a housing, a plurality of staves disposed to seat on the housing to provide a bearing surface, each of the staves comprising a strong body consolidated from laminated fibrous material impregnated with heat-hardening resinoid, a stop carried by the housing associated with at least one of the staves, and a laminated resilient wedge disposed in tight fitting relation between the stave and the stop to compensate for swelling of the stave under predetermined conditions, the laminated wedge consisting of oil resistant elastomer disposed between facing sheets of fibrous material impregnated with heat-hardening resinoid, the facing sheets being positioned adjacent the stave and the stop to facilitate the assembly of the bearing.

JOHN BOYD.